United States Patent
Bauder et al.

(10) Patent No.: US 7,896,166 B2
(45) Date of Patent: Mar. 1, 2011

(54) COMPACT FILTER ELEMENT

(75) Inventors: Ralf Bauder, Ketsch (DE); Karlheinz Muenkel, Oberderdingen-Flehingen (DE)

(73) Assignee: Mann + Hummel GmbH, Ludwigsburg (DE)

( * ) Notice: Subject to any disclaimer, the term of this patent is extended or adjusted under 35 U.S.C. 154(b) by 613 days.

(21) Appl. No.: 11/126,138

(22) Filed: May 11, 2005

(65) Prior Publication Data
US 2005/0252852 A1 Nov. 17, 2005

(30) Foreign Application Priority Data
May 11, 2004 (DE) .................. 10 2004 023 107

(51) Int. Cl.
*B01D 27/00* (2006.01)
*B01D 35/00* (2006.01)
*B01D 27/06* (2006.01)
*B01D 29/07* (2006.01)
*B01D 35/28* (2006.01)

(52) U.S. Cl. .............. 210/435; 210/438; 210/439; 210/440; 210/441; 210/454; 210/493.5

(58) Field of Classification Search .............. 292/56, 292/247, 116, 118; 210/493.5
See application file for complete search history.

(56) References Cited

U.S. PATENT DOCUMENTS

| | | | |
|---|---|---|---|
| 211,787 A * | 1/1879 | Reynolds et al. ........... 292/7 |
| 1,759,827 A | 5/1930 | Babitch | |
| 2,599,604 A * | 6/1952 | Bauer et. al. ............ 210/494.1 |
| 4,139,468 A * | 2/1979 | Rosaen ................... 210/130 |
| 5,858,227 A | 1/1999 | Stone et al. | |
| 5,902,479 A * | 5/1999 | Fukumori et al. ......... 210/248 |
| 5,967,111 A | 10/1999 | Hedman | |
| 6,190,432 B1 * | 2/2001 | Gieseke et al. .......... 55/385.3 |
| 6,517,598 B2 * | 2/2003 | Anderson et al. ......... 55/498 |
| 6,610,203 B1 * | 8/2003 | Jainek ................... 210/248 |
| 6,706,181 B1 * | 3/2004 | Baumann et al. ......... 210/236 |
| 6,709,588 B2 * | 3/2004 | Pavlin et al. ............ 210/248 |
| 6,896,803 B2 * | 5/2005 | Cline et al. ............. 210/248 |
| 2003/0010689 A1 * | 1/2003 | Yano et al. ............. 210/130 |

FOREIGN PATENT DOCUMENTS

| | | |
|---|---|---|
| DE | 19720775 | 11/1998 |
| EP | 1008375 | 6/2000 |
| GB | 281124 | 10/1927 |

OTHER PUBLICATIONS

European Search Report dated Sep. 2, 2005.

\* cited by examiner

*Primary Examiner*—Krishnan S Menon
*Assistant Examiner*—Benjamin Kurtz

(57) ABSTRACT

A compact filter element in which the end faces of a plurality of nonwoven filter layers (3) are fixedly integrated into a cover (4) and in which the oncoming flow of fluid to be filtered is deflected in the cover (4) in such a way that the fluid flows respectively into every second or alternating area between two adjacent nonwoven filter layers (3) and flows through the nonwoven filter layers (3) into the intervening spaces between the spaces between filter layers in to which it initially flows, from which intervening spaces it exits the filter element.

17 Claims, 6 Drawing Sheets

COMPACT FILTER ELEMENT

CROSS REFERENCE TO RELATED APPLICATIONS

This application claims priority from Federal Republic of Germany patent application no. DE 10 2004 023 107.9, filed May 11, 2004, the entire disclosure of which is incorporated herein by reference.

BACKGROUND OF THE INVENTION

The present invention relates to a compact filter element, in particular consisting of multiple filter layers stacked one above the other for filtering fluids, the element as a whole being insertable into a filter arrangement with a tight cover.

Published German patent application no. DE 197 20 775 A1 discloses a filter device of this general type for separating a liquid from gas streams in which a filter element is composed of nonwoven layers of fibers and is provided with a cover and a bottom and, optionally, with supporting elements, so that a flexibly adaptable filter element can be created with this arrangement.

SUMMARY OF THE INVENTION

It is an object of the present invention to provide an improved compact filter element.

Another object of the invention is to provide a filter element with a cover which ensures optimum guidance of the fluid to be filtered.

These and other objects are achieved in accordance with the present invention by providing a compact filter element in which a plurality of nonwoven filter layers have end faces fixedly integrated into a cover, and in which incoming fluid to be filtered is deflected in the cover so that the fluid enters the filter element by flowing into every second space between two adjacent nonwoven filter layers, said fluid then flowing through a nonwoven filter layer into the intervening spaces between said every second space and afterward exiting the filter element from said intervening spaces.

The present invention thus relates to a compact filter element in which a plurality of nonwoven filter layers is fixedly integrated into a cover at one axial end in an advantageous manner. According to this invention, the oncoming flow of fluid to be filtered is deflected in the cover in such an advantageous manner that the fluid flows into the next-but-one area between two nonwoven filter layers, i.e, into alternate spaces or into every other space between two adjacent layers and flows through the nonwoven filter layers into the intervening spaces between the alternating spaces into which it initially flows and then out of the filter element from said intervening areas or spaces.

The invention is especially advantageous when the nonwoven filter layers are comprised of coiled layers passing continuously around a coil core, the coil core and the coil layers wrapped around it, e.g., with a pleated or corrugated contour, having an oval or round cross section. According to another embodiment, however, the presence of a coil core here is not necessary.

In accordance with another advantageous embodiment, the filtered fluid can be guided out of the filter element through openings in the coil core, whereby the nonwoven filter layers and the coil core may also be fixedly integrated into a bottom and the nonwoven filter layers may be glued into the cover and/or the bottom in an advantageous manner.

BRIEF DESCRIPTION OF THE DRAWINGS

The invention will be described in further detail hereinafter with reference to illustrative preferred embodiments shown in the accompanying drawing figures, in which.

DETAILED DESCRIPTION OF PREFERRED EMBODIMENTS

Figure 1:
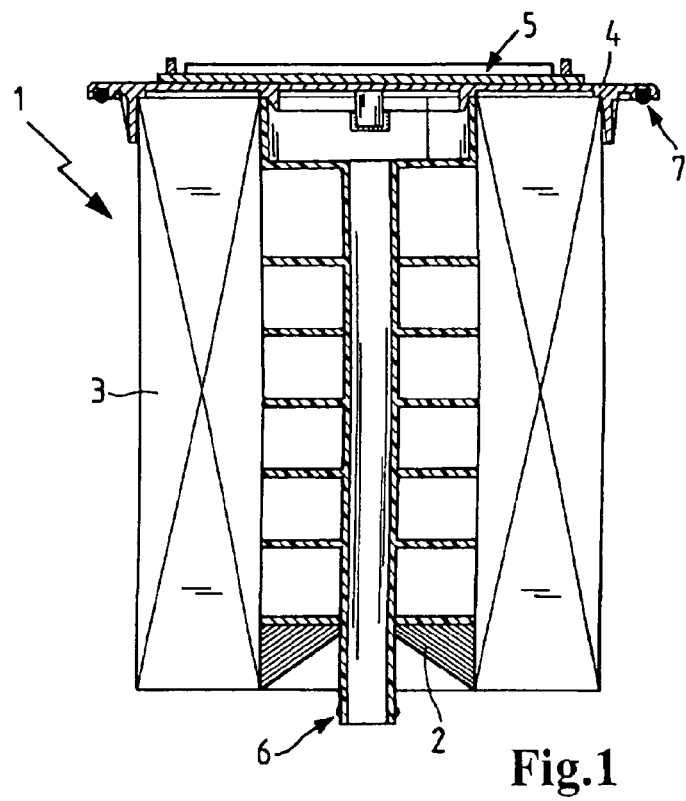
FIG. 1 is a sectional view through a coiled compact filter element integrated into a cover.

FIG. 1 shows a filter element 1 comprising a nonwoven filter layer 3 coiled around a coil core 2. A fluid to be filtered flows from the outside through the coil core 2 and/or through the nonwoven filter layers 3 in a manner which will be explained in greater detail below.

The coiled filter layer and core arrangement is fixedly connected to a cover 4, e.g., is glued into it. Cover 4 may optionally be provided with a handle 5 that can be turned up and thus forms a compact unit of a filter element 1 which can be inserted as a unit, e.g., through an engageable pipe connection 6 and through a gasket 7 into a filter housing (not shown here).

Figure 2:
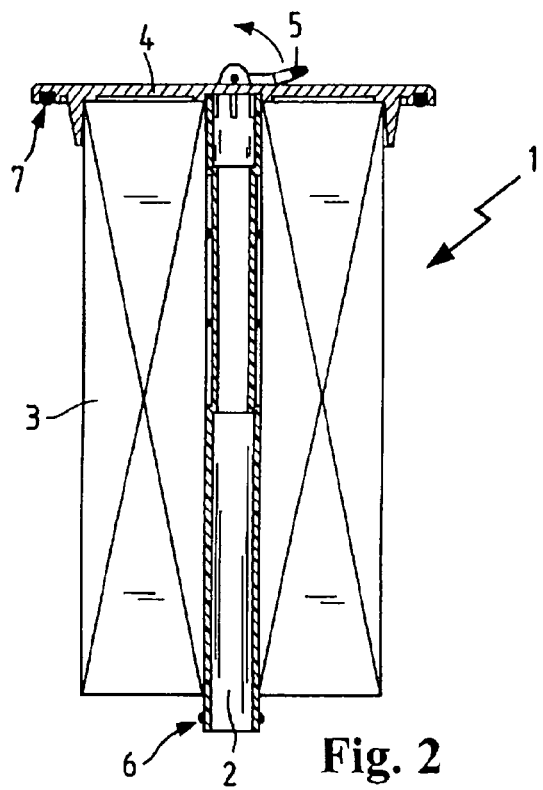
FIG. 2 is another sectional view through the filter element of FIG. 1 which shows the oval cross section of the coil core.

FIG. 2 shows the arrangement according to FIG. 1 in a sectional plane offset by 90°. It can be seen in FIG. 2 that the coil core 2 has an oval cross section. However, another suitable cross section, e.g., a round cross section, may also be used here.

Figure 3:
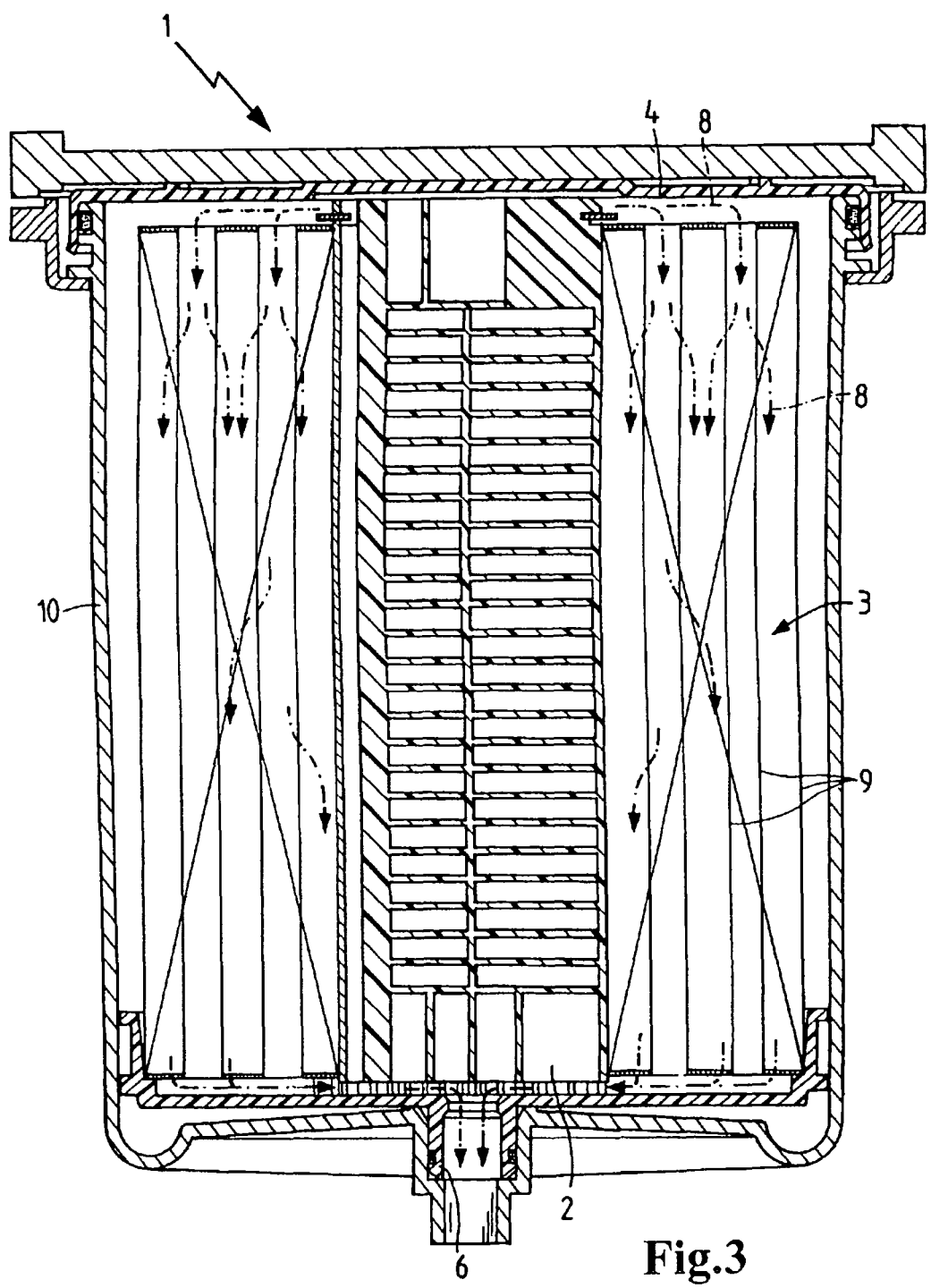
FIG. 3 is a detailed sectional view through the filter element according to the invention including a diagram of the flow of fluid to be filtered.

FIG. 3 shows how the fluid to be filtered flows according to the arrows 8 into the layers 9 of the nonwoven filter layers 3. The individual layers 9 are glued to the cover 4 of the filter 1 in such a way as to result in deflection of the fluid into the next-but-one intermediate layer of the nonwoven filter layers 3. This filter element 1, which thus has a compact design with the nonwoven filter layers 3 attached to the cover can easily be inserted into a filter housing 10.

Figure 4:
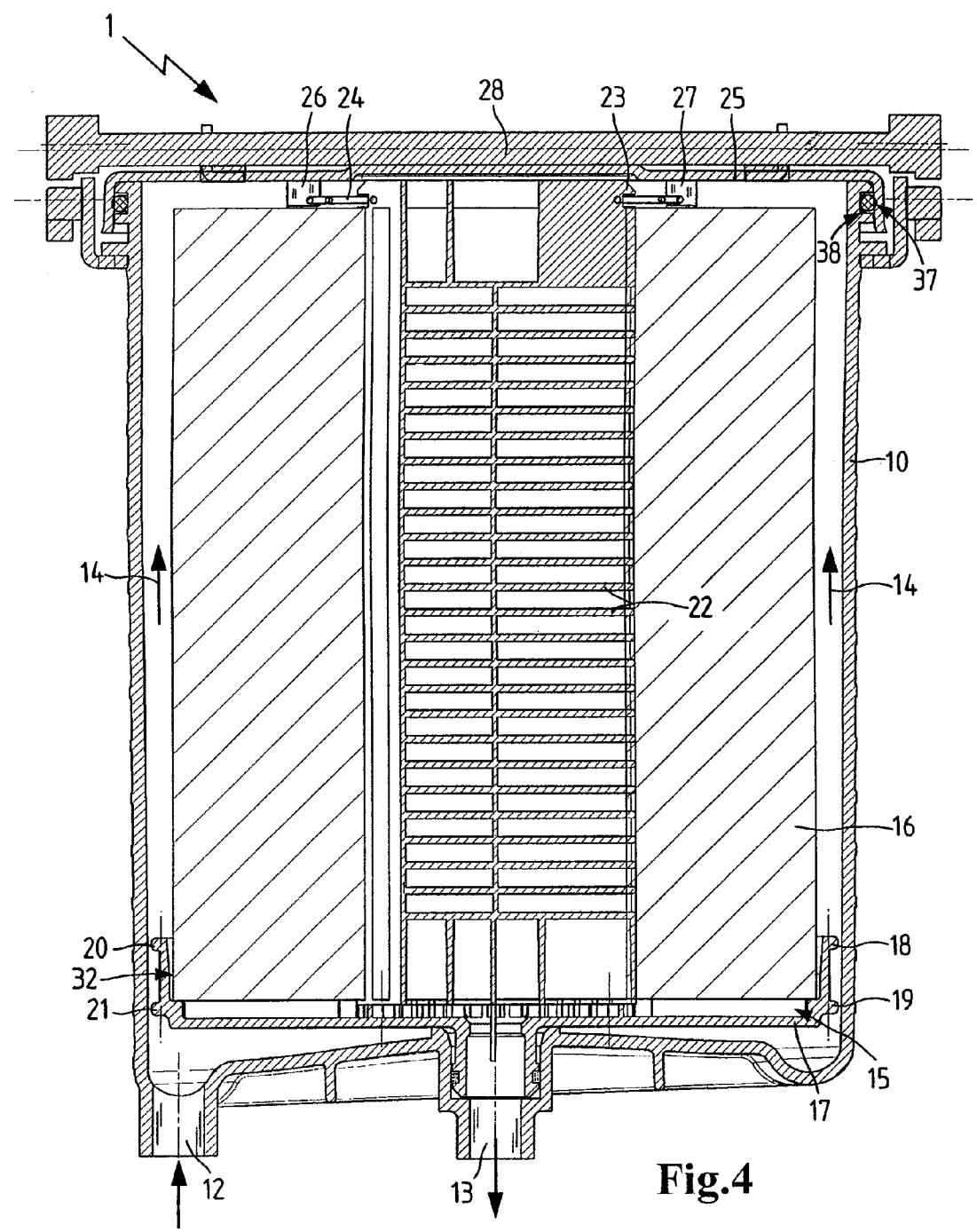
FIGS. 4 through 7 are illustrations of another illustrative filter element embodiment according to the invention in sectional diagrams and exterior views.

FIG. 4 shows a filter system having a housing 10 which can be closed by a cover 25. The housing has an inlet 12 for the liquid which is to be filtered and an outlet 13 for the liquid that has been filtered. The liquid to be filtered flows upward from the inlet 12, starting according to the arrow 14, and from there flows through the filter element, as shown in FIG. 3. The liquid collects in the area 15 and flows from there radially inward between the filter element 16 and the bottom plate 17 to the outlet 13. The bottom plate 17 is connected to the filter element 16, e.g., by an adhesive connection. The bottom plate is supported here on nubs 18, 19, 20, 21 as well as additional nubs (not shown here) on the housing 10.

The filter element 16 itself is coiled onto a core 22 which is provided with axially extending passages to reduce the amount of material. The core has holding noses and/or a peripheral holding zone in the upper area designed so that a spring disk 24 produces an axial fixation of the filter element 16. At the same time, the spring disk serves to secure the filter element and the core 22 on a cover 25. This cover is therefore provided with holding webs 26, 27 which are engaged with the spring disk 24 so that the filter element is connected to the cover via the spring disk 24 and the holding webs 26, 27 so that these parts can easily be removed from the housing 10.

A seal between the housing 10 and the cover 25 is accomplished via a suitable sealing ring 37 which is undetachably situated in a suitably shaped groove 38 on the housing 10.

Above the cover 25 there is a shaft which is part of a lever arrangement. This lever arrangement is explained in greater detail below. Since the filter element 16 is coiled directly onto the core 22, no soiled liquid can flow along the core out into the clean fluid area.

Figure 5:
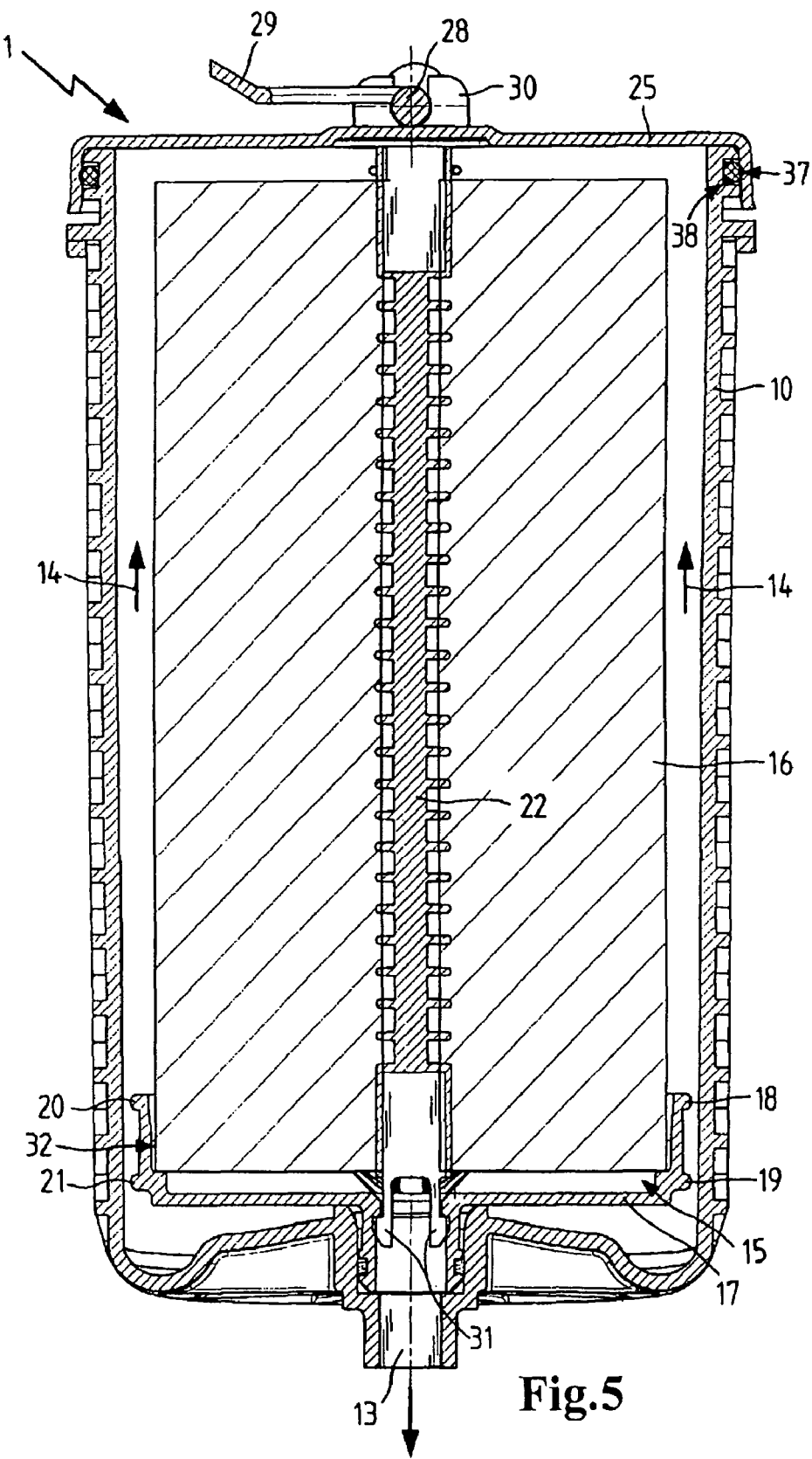

FIG. 5 shows the filter element depicted in FIG. 4 in a view pivoted by 90°. Like parts are identified by the same reference numerals. The lever device can be seen clearly in FIG. 5. The shaft 28 is provided with a handle 29. The shaft 28 itself is positioned in one or more bearing receptacles 30. It can be seen in FIG. 5 that the core 22 has a catch connection to the bottom plate 17, namely via the catch connection 31. The bottom plate itself is glued to the filter element 16 at the periphery in the area 32.

Figure 6:
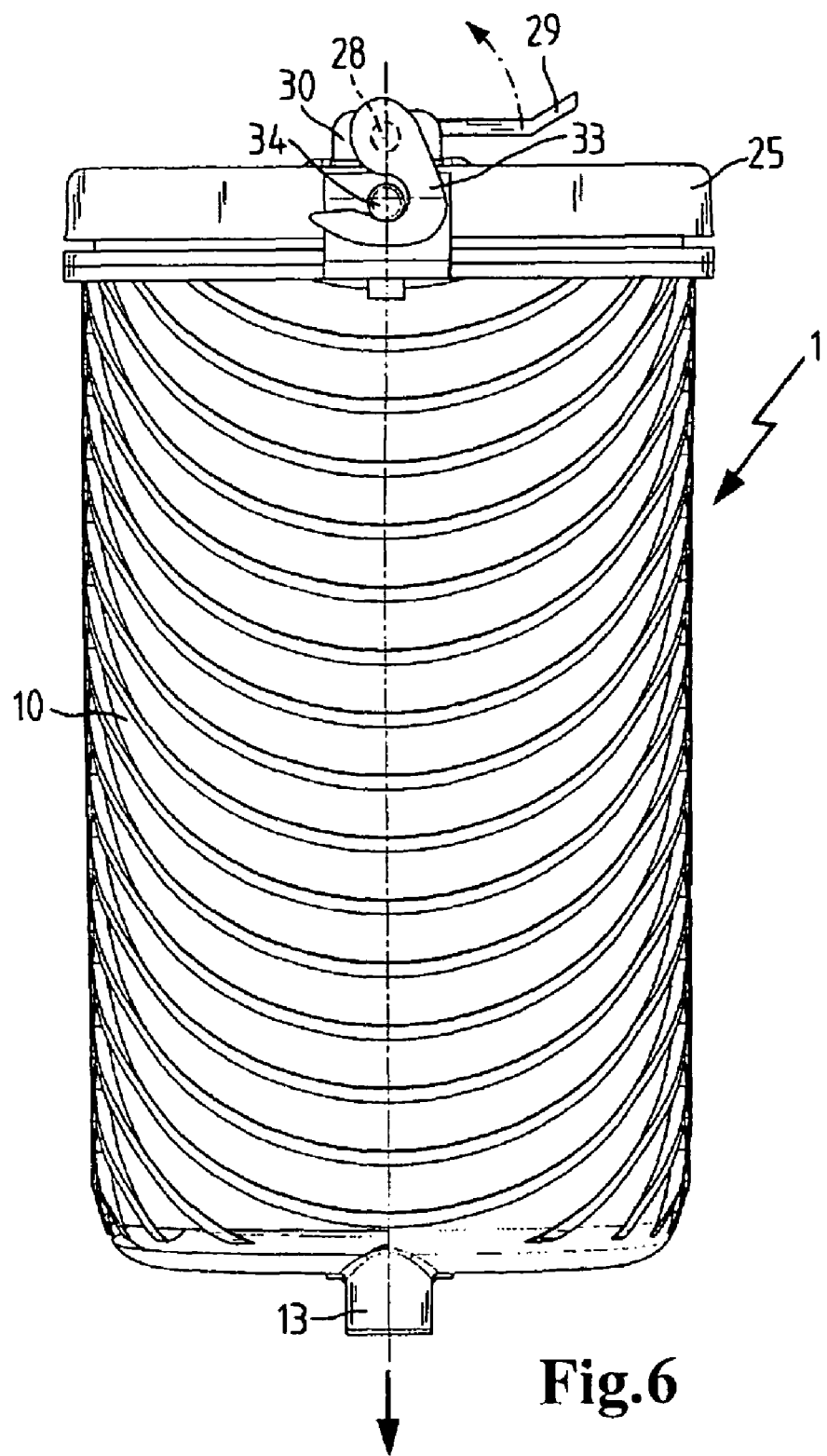

FIG. 6 shows an outside view of the filter system depicted in FIGS. 4 and 5. The outlet for the filtered cleaned fluid can be seen here along with the fastening principle for the filter element itself with the handle 29 and the bearing receptacle 30. On both sides of the shaft 28 there is a gripper hook 33 which fits around a mounting pin 34 on both sides. In the position illustrated here, the filter system is closed. When the handle 29 is turned over or around, the cover can be released and the filter element can be removed from the housing.

Figure 7:
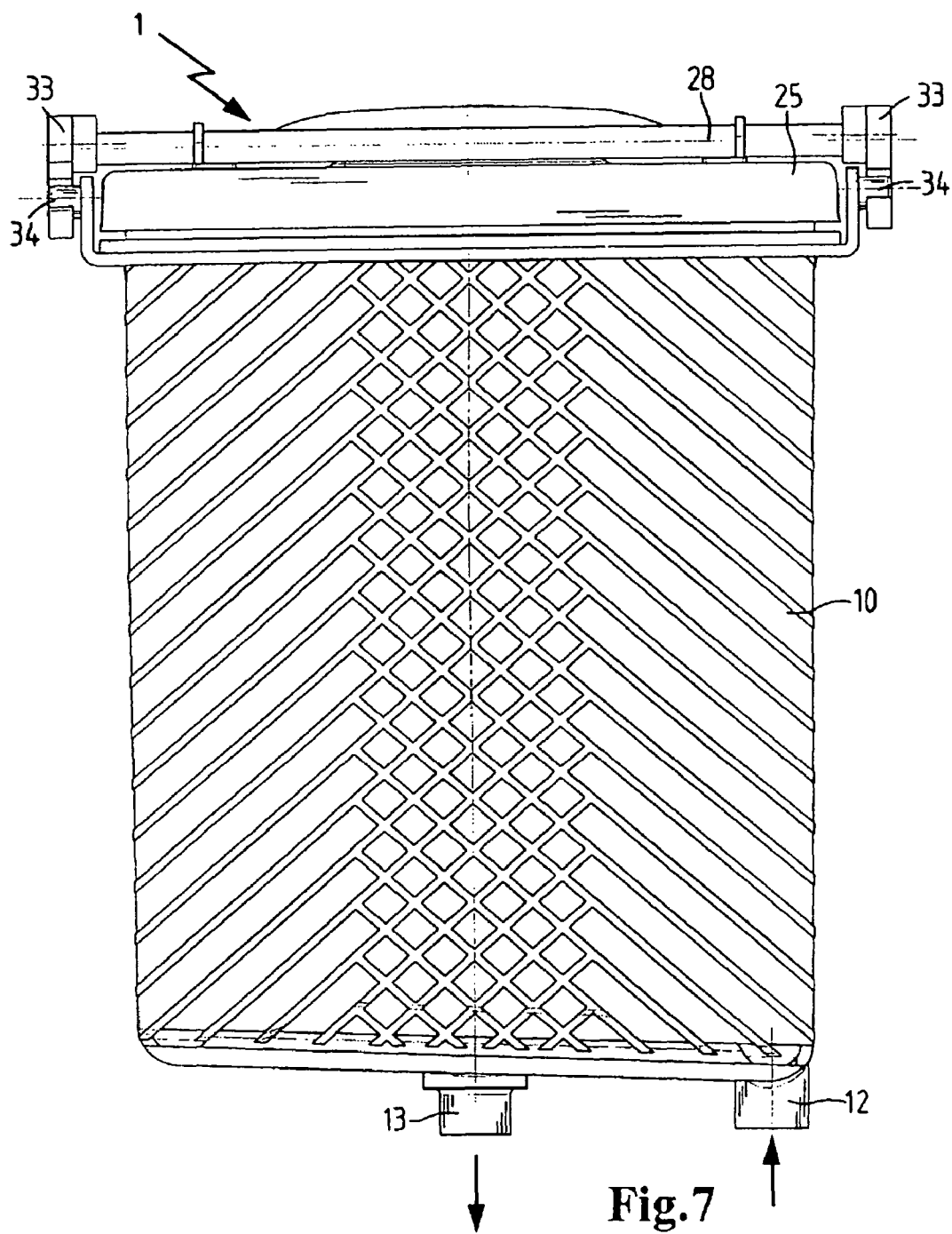

FIG. 7 shows another outside view of the filter system depicted in FIGS. 4 and 5. From a comparison of FIGS. 6 and 7, it can be seen that this is a system with an essentially oval shape. FIG. 7 shows the inlet 12 and the outlet 13 as well as the shaft 28 with the two hooks 33 and the journal 34.

The foregoing description and examples have been set forth merely to illustrate the invention and are not intended to be limiting. Since modifications of the described embodiments incorporating the spirit and substance of the invention may occur to persons skilled in the art, the invention should be construed broadly to include all variations within the scope of the appended claims and equivalents thereof.

What is claimed is:

1. A compact filter element and housing arrangement comprising:
    an elongated core,
    a nonwoven filter element coiled onto the core and including end faces;
    a first cover disposed in an upper region of the filter arrangement,
        individual layers of the nonwoven filter element being attached to the first cover such that incoming fluid to be filtered is deflected and enters the nonwoven filter element,
        said fluid then flowing through the nonwoven filter element and afterward exiting the filter element as filtered liquid;
    a housing in which the nonwoven filter element is enclosable and including an inlet, disposed at a bottom of the arrangement, for the incoming fluid to enter the arrangement, and
        an outlet, also disposed at the bottom of the arrangement, for filtered said filtered fluid to exit the arrangement,
        wherein the incoming fluid flows upward from the inlet between an outer portion of the nonwoven filter element and the housing toward the upper region of the arrangement, and from there flows through the nonwoven filter element;
    a resealable sealed connection formed between the housing and the first cover;
    a bottom plate supported at a lower region of the arrangement; and
    a rotatable device by which the first cover is releasable from the housing to permit removal of the first cover, the nonwoven filter element, the core and the bottom plate from the housing;
    wherein said elongated core is secured at a first end to said first cover;
    wherein said elongate core has a second end opposing said first end, said second end having a catch connection, said catch connection engaging said bottom plate of said filter element, said catch connection mounting said filter element to said core;
    wherein the nonwoven filter element is configured such that the filtered fluid collects in a collection area defined between said bottom plate and the nonwoven filter element and flows from the collection area radially inward between the nonwoven filter element and the bottom plate to the outlet, the bottom plate is connected to the nonwoven filter element by an adhesive,
        the bottom plate and the nonwoven filter element attached to the first cover are configured for insertion into the housing, and
        the core defines said catch connectable with the bottom plate connecting the bottom plate and core together.

2. The arrangement according to claim 1, wherein the nonwoven filter element comprises coiled layers wrapped continuously around said core.

3. The arrangement according to claim 1, wherein the nonwoven filter element consists of continuously coiled layers.

4. The arrangement according to claim 2, wherein the core and the coiled layers wrapped around the core have an oval cross section.

5. The arrangement according to claim 2, wherein the core and the coiled layers wrapped around the core have a circular cross section.

6. The arrangement according to claim 1, wherein the nonwoven filter element has a corrugated contour.

7. The arrangement according to claim 1, wherein the nonwoven filter element has a pleated contour.

8. The arrangement according to claim 2, wherein the filtered fluid is discharged from the filter element through openings in the core.

9. The arrangement according to claim 1, wherein the nonwoven filter element is glued to the first cover.

10. The arrangement according to claim 2, wherein the nonwoven filter element is glued to both the first cover and to the bottom plate.

11. The arrangement according to claim 1, wherein said filtered fluid emerges from the nonwoven filter element at an end of the nonwoven filter element proximate the inlet and the outlet and into the collection area.

12. The arrangement according to claim 2, wherein an adhesive bonds the nonwoven filter element to the core.

13. The arrangement according to claim 2, wherein said core is secured to said first cover via a flat annular spring disk, said spring disk having an open center sized to fit over and mountably engage said core, said spring disk having an outer portion fixedly and mountably engaging retaining webs on said first cover.

14. The arrangement according to claim 1, wherein
    the first cover is provided with at least one bearing receptacle;
    a shaft is provided in the bearing receptacle; and at least two hooks are arranged on said shaft to engage with pins on the housing for fastening the first cover to the housing.

15. The arrangement according to claim 1, wherein the adhesive connection between the bottom plate and the nonwoven filter element is located at an outer peripheral portion of the bottom plate.

16. The arrangement according to claim 1, wherein
said bottom plate forms an engageable pipe connection extending axially outwards from said bottom plate, said engageable pipe connection one-piece with said bottom plate, said engageable pipe connection axially inserted into a fluid opening of said outlet of said housing.

17. The arrangement according to claim 16, wherein
said catch connection comprises at least one pair of opposing "L" shaped prongs secured to and extending axially outwards from said second end of said core, said "L" shaped prongs engaging an inner wall of said engageable pipe connection mounting said filter element to said core.

* * * * *